Feb. 3, 1925.
C. W. KING
HOLDER
Filed June 18, 1924
1,525,401
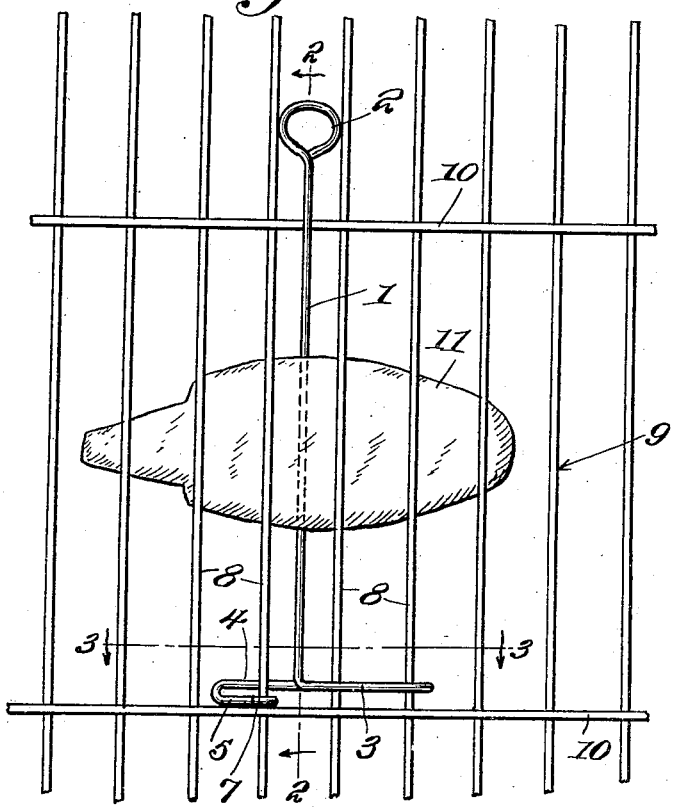
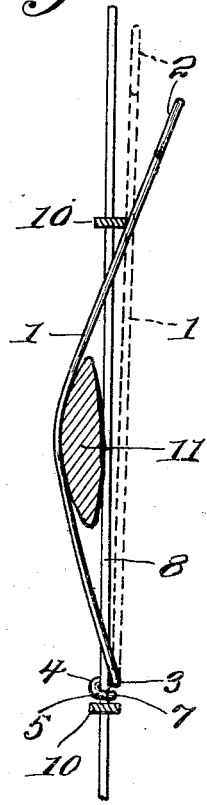
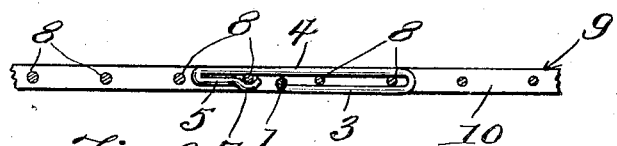
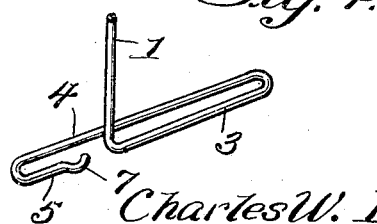

Patented Feb. 3, 1925.

1,525,401

UNITED STATES PATENT OFFICE.

CHARLES W. KING, OF ST. LOUIS, MISSOURI.

HOLDER.

Application filed June 18, 1924. Serial No. 720,853.

*To all whom it may concern:*

Be it known that I, CHARLES W. KING, a citizen of the United States, residing at St. Louis, in the county of St. Louis City and State of Missouri, have invented new and useful Improvements in Holders, of which the following is a specification.

My present invention has reference to a means for holding a cuttle bone in a bird cage, of a construction to prevent the spreading of the wires of the cage and the consequent destruction thereof, as well as the wasting of the cuttle bone.

To the attainment of the foregoing, reference is to be had to the drawing which accompanies and forms part of this application.

In the drawing:—

Figure 1 is a fragmentary elevation of a bird cage illustrating the arrangement of my improvement thereon.

Figure 2 is a sectional view approximately on the line 2—2 of Figure 1.

Figure 3 is a sectional view approximately on the line 3—3 of Figure 1.

Figure 4 is a perspective view of the lower portion of the improvement.

As disclosed by the drawing, my improvement is constructed from a single piece of spring wire, comprising a central straight and what I will term a body portion 1 that has one of its ends terminating in an eye 2. The opposite end of the body is bent and continued laterally to provide an arm 3. The arm 3 is rounded at its end and from thence continued to provide a second arm 4 which is spaced from but in a line with the arm 3. The arm 4 is of a greater length than the arm 3 and has its outer end rounded and extended to provide a short arm 5 directed toward but terminating away from the arm 3. The arm 5 has its extremity rounded to form the same with a hook 7.

The device is arranged between the vertical rods 8 of the cage 9 by extending the substantially U-shaped base portion thereof in a line with the eye so that the arms 3 and 4 will have their rounded end arranged at the opposite sides of one of the wires or bars 8 of the cage. Thereafter the body 1 is turned to bring the arm 4 against the inner sides of the bars or wires 8. By reference to the drawing, it will be seen that the arm 5, while in the plane with the arm 3, is arranged therebelow, and the operator grasps the hook 7 and permits the same to spring against one of the wires or vertical bars of the cage. The body of the improvement is in contact with one of the longitudinal bars 10 of the cage, and a cuttle bone 11 may be readily inserted between the bars 8 of the cage and the body element 1 of the improvement. This overcomes the necessity of bending the wires or bars 8 of the cage for the arrangement of the cuttle bone 11 therein and further allows the cuttle bone to be moved vertically to desired positions in the cage.

Having described the invention, I claim:—

A device for the purpose set forth, comprising a spring wire member having an eye at one end, its other end bent and extended laterally therefrom and terminating in a rounded portion that provides one end of a second arm which extends beyond but which is parallel with the first mentioned arm, said last mentioned arm having its end rounded downwardly and extended toward the first mentioned arm but terminating away therefrom, and the end of the last mentioned arm being rounded to provide a hook.

In testimony whereof I affix my signature.

CHARLES W. KING.